United States Patent [19]
Wolter et al.

[11] Patent Number: 5,322,216
[45] Date of Patent: Jun. 21, 1994

[54] SYSTEM AND METHOD FOR CONTROLLING OUTLET WATER TEMPERATURE OF AN INSTANTANEOUS WATER HEATER

[75] Inventors: Gerry C. Wolter; Larry J. Honn; Frederick M. Orringer, Jr., all of Cincinnati, Ohio; Richard W. A. Slamka, Vancouver, Canada

[73] Assignees: Leslie M. Sandler; E. Jeffery Casper

[21] Appl. No.: 916,197

[22] Filed: Jul. 17, 1992

[51] Int. Cl.$^5$ .................... F22B 35/00; F28F 27/00
[52] U.S. Cl. .................... 236/25 R; 236/78 B; 236/91 F; 219/475
[58] Field of Search .................... 236/25 R, 25 A, 23, 236/24, 91 F, 78 B; 219/475

[56] References Cited

U.S. PATENT DOCUMENTS

| | | | |
|---|---|---|---|
| 2,879,943 | 3/1959 | Dubitzky et al. | 236/25 R |
| 3,815,813 | 6/1974 | Charron et al. | 236/23 |
| 3,917,162 | 11/1975 | Trotter et al. | 236/23 |
| 4,337,893 | 7/1982 | Flanders et al. | 236/1 EB |
| 4,501,261 | 2/1985 | Tsutsui et al. | 236/20 R |
| 4,638,944 | 1/1987 | Kujawa et al. | 237/8 R |
| 5,039,007 | 8/1991 | Wolter | 236/12.1 |

FOREIGN PATENT DOCUMENTS 0138020  6/1986  Japan ........................ 236/25 P Primary Examiner—William E. Wayner
Attorney, Agent, or Firm—Barbara Joan Haushalter

[57] ABSTRACT

An apparatus accurately controls output water temperature of an instantaneous water heater to maintain a desired outlet temperature. A first electronic sensing device senses a flow of water through the heater, and an ignition sequence commences when flow has been detected. A second electronic sensing device senses an outlet water temperature of the heater, and a third electronic sensing device senses a midway water temperature of the heater. The burner output or outputs are controlled to maintain the desired outlet temperature, based on changes in water flow and incoming water temperature. With multiple burners, the burner outputs are staged to accurately control the output water temperature of the instantaneous water heater to maintain the desired outlet temperature.

53 Claims, 4 Drawing Sheets

SYSTEM AND METHOD FOR CONTROLLING OUTLET WATER TEMPERATURE OF AN INSTANTANEOUS WATER HEATER

BACKGROUND OF THE INVENTION

The present invention relates to instantaneous water heaters and, more particularly, to a method and apparatus for accurately controlling the output water temperature of an instantaneous water heater.

Typically, most buildings, both houses and commercial, are built with heating sources for domestic hot water. This includes energy conversion units and distribution systems, largely tank type storage units, namely gas or oil burners or electric elements; sets of controls, namely thermostats, thermocouples, electric valves and regulators; hot water storage tanks and heat exchangers; and conduits for transferring the heated water. All of these components result in an unduly large system required for heating water.

Such large systems tend to be inefficient and inconvenient in large homes or buildings, and entirely impractical for vacation cabins, land and water based recreational vehicles, house trailers, firemen's hazardous material decontamination units, and military field water uses, all of which have limited space and weight and require their own independent water sources as distinguished from those using common water supplies of municipalities.

In situations where space is at a premium, it has been the general practice to provide a liquid or gaseous hydrocarbon tank type water heating unit having a very low water capacity and heating capacity. Although the unit satisfies the requirement of compactness, the low capacity places limits on bathing and other hot water usage. Another problem associated with tank type water heaters is rather low efficiency and standby heat loss. The result is higher energy use. When water is heated and stored, heat loss from the tank occurs and the water has to be re-heated to the appropriate temperature.

One solution, in situations where water is readily available, is to use a tankless, on-demand water heater to provide hot water. Such a heater conserves space and produces higher quantities of hot water when compared to the comparable sized tank type heater. These systems tend to be more energy efficient because tank stand-by heat loss is eliminated. Unfortunately, a problem which exists with instantaneous water heaters is maintaining precise temperature control with varying flow rates and varying incoming ambient water temperatures. Wide temperature fluctuations occur as additional water taps are opened or closed. Obviously, poor control of water temperature can create negative responses from users, from mild annoyance to actual safety hazards. For example, fluctuations in hot water temperature can cause burns to bathers during a shower, and to small children using hot water.

It is seen then that there exists a need for a system and method for heating water which can precisely control output water temperature, even with varying flow rates and varying incoming ambient water temperature. It would also be desirable to have such a system and method which eliminates some of the troublesome mechanical components of current instantaneous water heaters. Finally, it would be desirable to have such a system and method which has a higher heating capacity, giving it the ability to precisely control large heat exchangers at low water flows.

SUMMARY OF THE INVENTION

This need is met by the apparatus and method for accurately controlling output water temperature of an instantaneous water heater to maintain a desired outlet temperature. The instant invention is directed to control of a water heater which has a heat exchanger with water tubing, a burner means for heating the heat exchanger, and a main fuel passage means for supplying fuel to the burner means. The water heater according to the present invention is capable of automatically adjusting a burner means output for changes in water flow and incoming water temperature.

In accordance with one aspect of the present invention, an apparatus for accurately controlling output water temperature of an instantaneous water heater to maintain a desired outlet temperature, comprises a first electronic sensing device for sensing a flow of water through the water tubing and providing a flow signal to a control module, and a means for starting an ignition sequence when flow has been detected. The apparatus further comprises a second electronic sensing device for sensing an outlet water temperature at an outlet of the water tubing and for providing outlet water temperature information to the control module, and a third electronic sensing device for sensing a midway water temperature in the water tubing and providing midway water temperature information to the control module. An adjustment means receives the flow signal, the outlet water temperature information, and the midway water temperature information from the control module to control the burner means BTU output to maintain the desired outlet temperature. The apparatus further comprises a means for comparing the midway water temperature information and the outlet water temperature information and providing a comparison signal based on a comparison of a percentage difference of the midway water temperature and the outlet water temperature. The comparison signal is used to reduce a reaction time of the adjustment means which controls the burner means output.

The present invention also provides for a method of accurately controlling output water temperature of an instantaneous water heater to maintain a desired outlet temperature for a water heater having multiple burners. The method provides the ability to precisely control large heat exchangers at low water flows. The control module comprises a programmable microchip for controlling staging of the plurality of burners to maintain the desired output water temperature. The method comprises the steps of providing a primary burner means having a first burner output and a secondary burner means having a subsequent burner output, the first and subsequent burner outputs having a combined total burner output for achieving a desired outlet water temperature. A solenoid valve is used to adjust a percentage of the total burner output of the instantaneous water heater. When the solenoid valve is in the off position, an ignition sequence is started and the primary burner means is ignited. When the first burner output demand reaches a predetermined value, preferably approximately 80% load, the solenoid valve is opened and the secondary burner means is ignited. The method then comprises the step of modulating the first and subsequent burner outputs to maintain a total burner output for accurately controlling output water temperature of the instantaneous water heater to the desired outlet temperature. When the first and subsequent burner output demands reach a predetermined value, preferably approximately 20% load, the solenoid valve is closed and the secondary burner means is turned off. The first burner means output is then modulated to accurately control output water temperature of the instantaneous water heater to the desired outlet water temperature.

Accordingly, it is an object of the present invention to provide an apparatus and method for accurately controlling output water temperature of an instantaneous water heater. It is a further object to provide such an apparatus and method wherein the water heater has one or multiple burners. It is an advantage of the present invention that the water heater is capable of automatically adjusting the burner means output to immediately account for changes in water flow and incoming water temperature.

Other objects and advantages of the invention will be apparent from the following description, the accompanying drawings and the appended claims.

DETAILED DESCRIPTION OF THE PREFERRED EMBODIMENTS

The instantaneous water heater of the present invention has an increased heating capacity for water heating, capable of supplying heated water at a desired temperature for use in washing or other normal hot water uses. The instantaneous water heater of the present invention has a heat exchanger with water tubing and is capable of automatically adjusting a burner means output for changes in water flow and incoming water temperature. When the burner means comprises a single burner, the water heater of the present invention will have low range or high range heating capacity, typically as low as 35,000 BTU input capacity and as high as 275,000 BTU input capacity. Additionally, when the burner means comprises multiple burners, the heating capacity range satisfies a high range heating capacity, typically is 75,000 BTU per hour and upward, limited only by the size of the unit for the desired gallons per minute and temperature.

Figure 1:
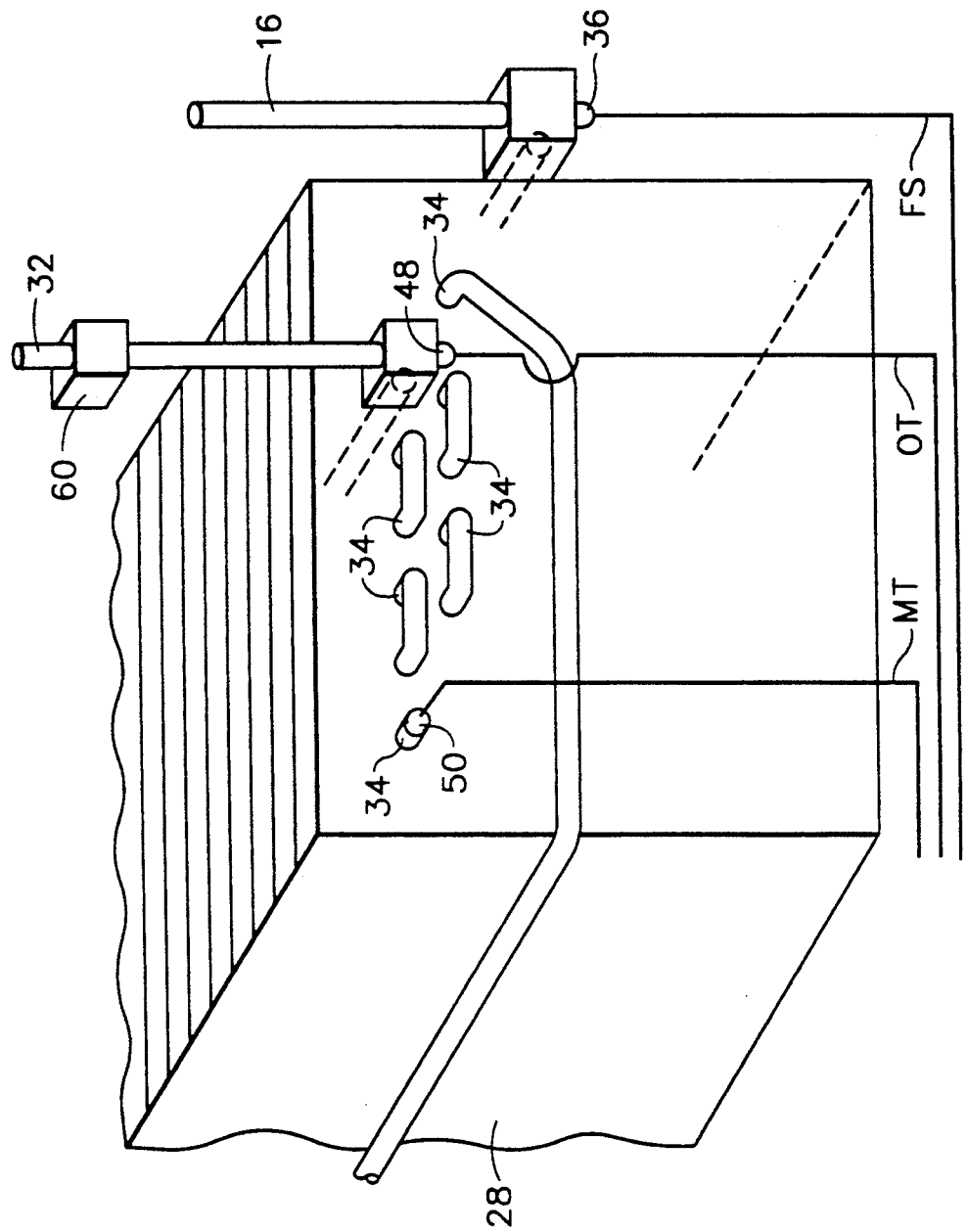
FIG. 1A is an exploded perspective view of a water heating system in accordance with one embodiment of the present invention.
FIG. 1B is a view of the water heating system of FIG. 1A, taken along line 1B—1B of FIG. 1A.
Figure 1A:
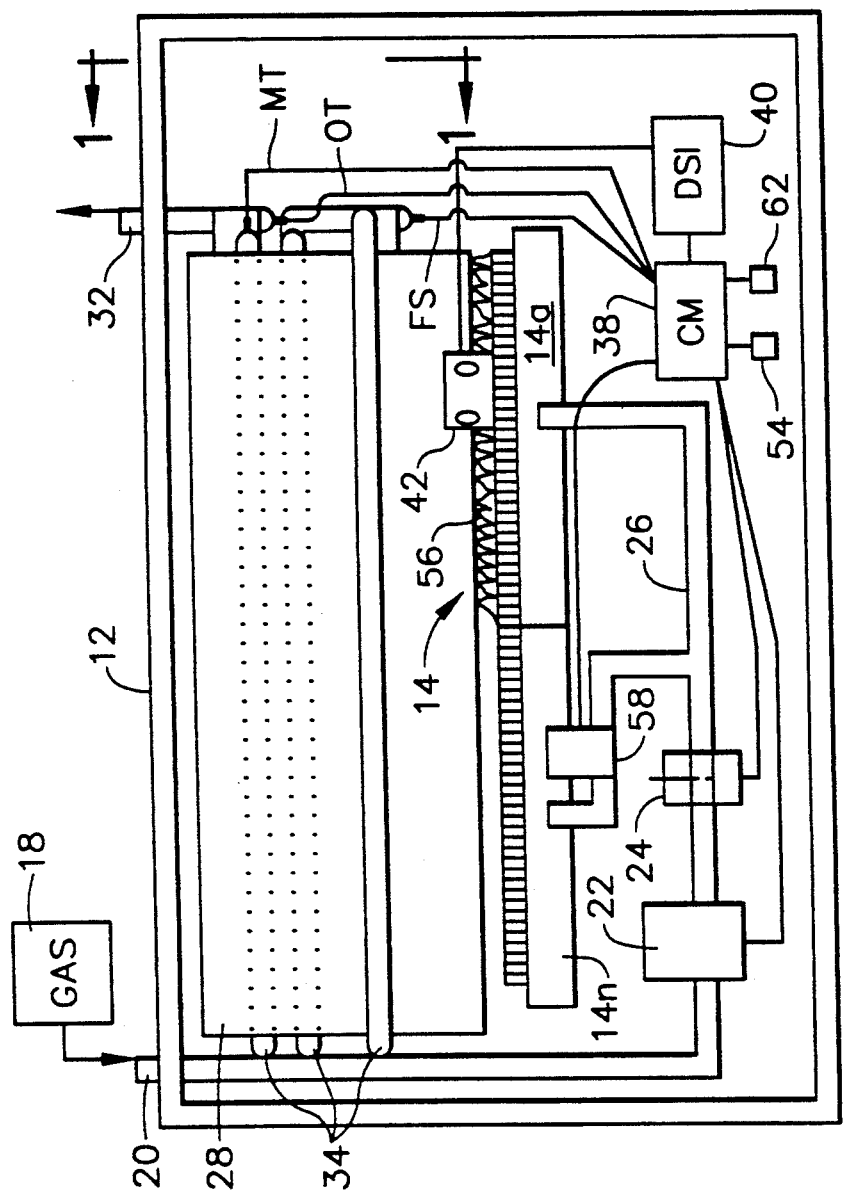

Referring now to the drawings, in FIGS. 1A and 1B there is illustrated an exploded perspective view of a water heating system 10 in accordance with one embodiment of the present invention. The water heating unit 10 includes an outer casing 12, shown open at the front to illustrate parts of the unit 10. A gas burner means 14 is mounted in the casing 12 to heat cold water, incoming through a cold water pipeline 16. The burner means 14 may comprise one burner 14, or multiple burners 14a and 14n. Gas fuel such as propane from a container 18 passes through a line 20, through a regulator solenoid unit 22, a modulating orifice 24, and a line 26 to the burner means 14. The modulating orifice 24 may be mechanically or electrically operated. The water incoming at the cold water line 16 is heated by the burner means 14 as it travels through a heat exchanger 28. The resulting hot water then exits the system 10 at a hot water exit pipe 30.

Figure 2A:
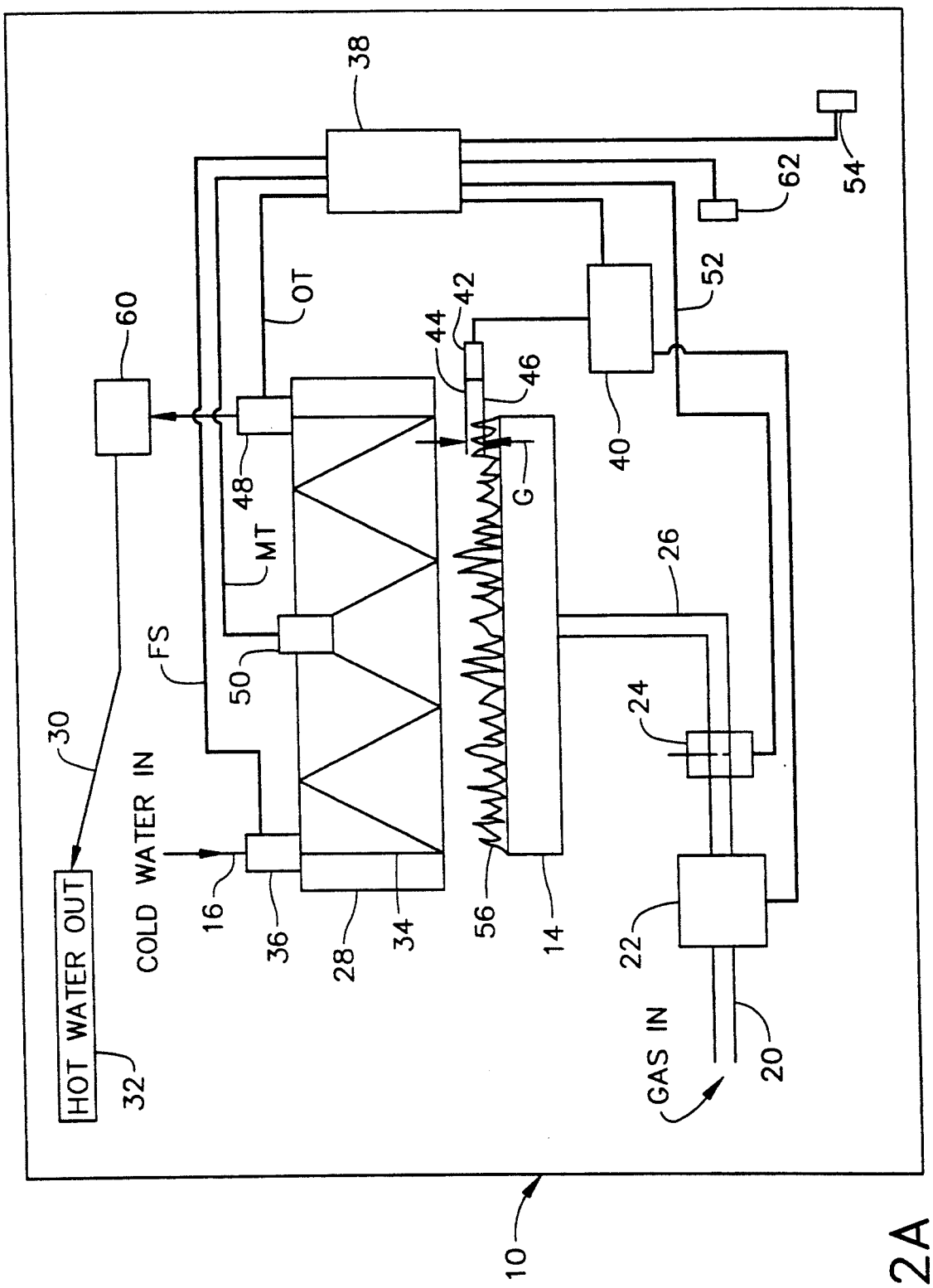
FIGS. 2A and 2B are schematic block diagrams of the system of FIGS. 1A and 1B.
Figure 2B:
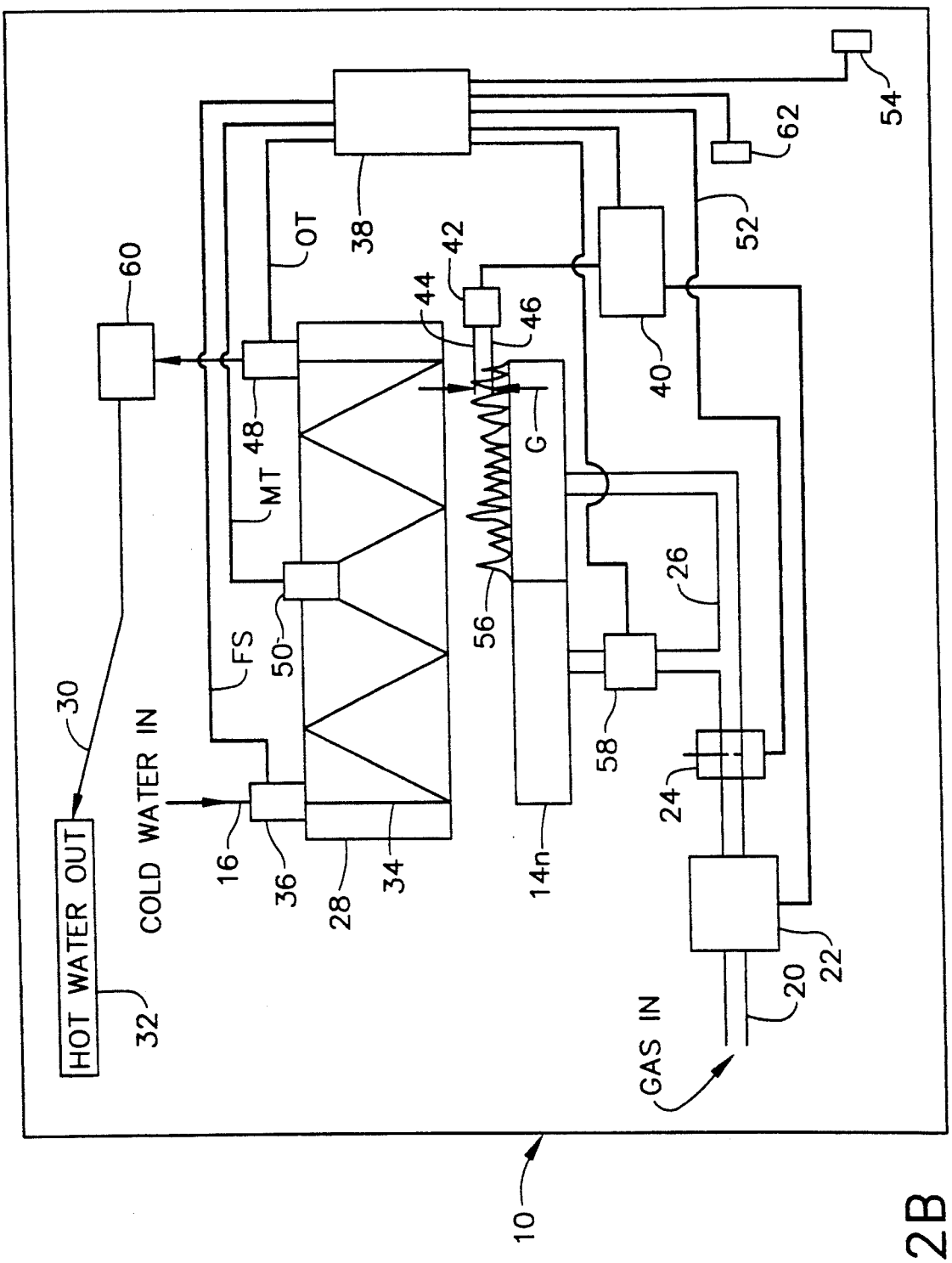

Referring now to FIGS. 2A and 2B, and continuing with FIGS. 1A and 1B, when a water outlet source such as a hot water faucet 32 associated with the hot water outlet pipe 30 is opened, cold water under pressure is permitted to flow through the cold water line 16 and into the system 10. The cold water flows into the fin tube heat exchanger 28 to pass through water tubing 34. A first electronic sensing device 36 senses the flow of water through the water tubing 34 of the heat exchanger 28 and provides a flow signal FS to a control module 38. When a sufficient flow of water in the heat exchanger 28 is sensed by the first electronic sensing device 36, as for example two quarts per minute, the burner means 14 is ignited to heat the water in the heat exchanger 28.

The burner means 14 may comprise a single burner 14a, as illustrated in FIG. 2A, or multiple burners 14a and 14n, as illustrated in FIG. 2B, where n may be any number of burners. With the schematic block diagram illustrated in FIG. 2A, the water heating unit 10 of the present invention will have low and high range heating capacity, typically between 35,000 and 275,000 BTU input heating capacity. When the burner means 14 comprises multiple burners, as shown in FIG. 2B, the heating capacity range satisfies an even higher range heating capacity, typically upwards from 75,000 BTU per hour, limited only by the size of the unit 10 for the desired gallons per minute and temperature. When multiple burners are used, a unique staging control is employed to maintain the desired outlet water temperature, as described in more detail below.

The first electronic sensing device 36 is typically located at an inlet to the heat exchanger 28, and may be defined as an inlet electronic sensing device 36, which may comprise a thermistor or a combination of a thermistor and a flow meter. The first or inlet electronic sensing device 36 indicates a water flow-no flow condition to activate or deactivate the burner means 14. Although this is achieved by a thermistor in a preferred embodiment, any suitable means may be used, including mechanical, infrared, sonic, infrasonic, or other device acting as a flow switch, flow meter, or other flow detection means, for sensing a flow-no flow condition as well as a rate of flow. When the hot water tap 32 is turned on, water flow starts through the water heater 10. As incoming cold water flows over the first thermistor 36, heat is dissipated from the energized thermistor tip and this "cooling" is detected by the control module 38. Upon detection of this condition, indicated by the flow signal FS, the control module 38 activates or powers a direct spark ignition (DSI) or hot surface ignition (HSI) board 40. The board 40 opens the regulator solenoid unit 22, containing a pressure regulator, a main solenoid, and a redundant solenoid. The redundant solenoid is a safety feature, in the event that the main solenoid fails. When the regulator solenoid unit 22 is opened, gas is allowed into the pressure regulator portion of unit 22, through the main gas solenoid portion of unit 22, and through the redundant solenoid portion of unit 22. The gas from the regulator solenoid unit 22 then flows to the modulating orifice 24. Gas flows through the electromagnetic variable orifice or modulating valve 24 along gas line 26 to the burner 14. The board 40 simultaneously sends a high voltage signal to an igniter probe 42, causing a high voltage spark across a gap G between probes 44 and 46 igniting the gas/air mixture from burner 14. When the first electronic sensing device 36 senses cessation of the water flow, the burner means 14 output is turned off.

Continuing with FIGS. 2A and 2B, a second or outlet electronic sensing device 48, preferably located at an outlet of the water tubing 34 of the heat exchanger 28, senses an outlet water temperature and provides the outlet water temperature information OT to the control module 38. Additionally, a third or midway electronic sensing device 50 senses a midway water temperature at an approximate half way point in the water tubing 34 of the heat exchanger 28, and provides midway water temperature information MT to the control module 38.

Changes in water flow and incoming water temperature are conditions of water usage, with the goal of the present invention being to accurately maintain the desired outlet water temperature in spite of these changes. When changes in water flow or incoming water temperature occur, these changes are detected by one of the three electronic sensing devices 36, 48, or 50. The detected changes from the electronic sensing devices 36, 48, and 50 are provided to the control module 38. Since a programmable microchip in the control module 38 controls the modulating orifice 24, as indicated by line 52, changes in water flow and incoming water temperature are adjusted for by the modulating orifice 24. The programmable microchip of the control module 38 controls the modulating orifice 24, and supplies information to all of the other components of the system 10, whether the system 10 comprises one or multiple burners. The programmable microchip of the control module 38 also shares some safety functions with the board 40, as described in more detail below.

The control module 38 of the present invention, then, is an electronic board that comprises a microchip, and is capable of interpreting information from the electronic sensing devices and causing response thereto. The microchip receives information from the electronic sensing devices 36, 48, and 50 to control the modulating orifice 24. For example, information from the first electronic sensing device 36 provided to the control module 38 determines if the control module power to the board 40 is to be on or off. The control module 38 regulates the position of the modulating orifice 24 based on information from the second and third electronic sensing devices 48 and 50, depending on which electronic sensing device, 48 or 50, is in control of the modulating orifice 24, as described in more detail below. The control module 38 determines which of the second or third electronic sensing devices 48 and 50 is controlling the modulating orifice 24, by reading a percentage difference between the two electronic sensing devices 48 and 50. Also, the control module 38 returns the modulating orifice 24 to the ignition start position any time the board 40 has been deactivated.

The adjustments made by the modulating orifice 24 are made to correspond to a pre-set outlet water temperature condition, set at a set-point thermostat 54, shown in FIGS. 2A and 2B. The set-point thermostat 54 determines the desired output water temperature and provides this determination to the control module 38. The set-point thermostat 54 can be manually or electronically controlled, depending on the use of the water heater. The set-point thermostat 54 can automatically change or adjust the actual outlet water temperature of one or more staged water heaters to maintain the desired outlet water temperature at faucet 32.

As a safety feature, in a preferred embodiment the board 40 "proofs" a flame 56 from the burner 14 and causes a closed circuit by conducting DC voltage across the gap G between the igniter probes 44 and 46, conducted through the flame 56. As long as this circuit remains closed, the board 40 will report flame detection and the main and redundant gas solenoids of unit 22 will remain open. If the circuit is broken, such as when the flame 56 is blown off the burner means 14 by a down draft or is extinguished from lack of oxygen, the DC voltage circuit is interrupted at gap G between the igniter probes 44 and 46, indicating a flame out. In this situation, the main and redundant gas solenoids of unit 22 are deactivated and returned to their normally closed positions, shutting the gas off to the burner means 14.

A further safety feature is achieved by having the electrical power to the board 40 controlled by the control module 38. If the temperature exceeds a preprogrammed high temperature set point at the second electronic sensing device 50, such as a specific high temperature, e.g., 180° F., or a predetermined percentage difference between the electronic sensing devices 48 and 50, the control module 38 will detect this condition from the temperature information supplied by electronic sensing devices 48 and 50. This detects an overheat condition in the heat exchanger and cuts the power supply to the board 40, closing the gas solenoids at unit 22 by deactivating and returning the solenoids at unit 22 to their normally closed positions. This, in turn, shuts off the gas to the burner means 24. This eliminates the need for a separate high temperature flue gas sensor in the flue gas stream and a separate water high temperature limit switch in the hot water line.

As stated, changes in the flow signal FS from the control module 38 and the incoming water temperature are detected by the electronic sensing devices 36, 48, and 50, which provide the flow signal FS, the outlet water temperature information OT, and the midway water temperature information MT, respectively, to the control module 38. This information is used by an adjustment means, such as an electrically controlled orifice or valve, and preferably the electromagnetic variable orifice 24, to control the burner means output 56 and, thereby, maintain the desired outlet water temperature at hot water outlet 32 to correspond to the pre-set condition at set-point thermostat 54. The single modulating orifice 24 can be used to control the burner means 14, regardless of the number of burners comprising the burner means. Alternatively, more than one modulating orifice 24 can be used if desired.

When the burner means 14 comprises a plurality of burners, the programmable microchip of the control module 38 can be used to control staging of the multiple burners to maintain the desired output water temperature at faucet 32, as described in more detail below. The control module receives the midway water temperature information MT and the outlet water temperature information OT and provides a comparison signal based on a comparison of a percentage difference of the midway water temperature and the outlet water temperature. The purpose of this is to reduce a reaction time of the adjustment means 24 which continually adjusts or controls the burner means 14 output in response to changes in the desired outlet water temperature. The changes can be caused by a variety of factors, including adjustment of the faucet 32 by a user, or the turning on or off of additional faucets serviced by the same water heater.

The second electronic sensing device 48 comprises a primary means for controlling the adjustment means 24, and the third electronic sensing device 50 comprises a secondary means for controlling the adjustment means 24. Since the set-point thermostat 54, which is a temperature selection thermostat, determines the value of the second electronic sensing device 48, the value of the second electronic sensing device 48 can be adjusted by adjusting the set-point thermostat 54. The secondary means for controlling the adjustment means overrides the primary means for controlling the adjustment means when the comparison signal is greater than a predetermined comparison signal, until the comparison signal becomes less than or equal to the predetermined comparison signal. Hence, the primary and secondary means for controlling the adjustment means actually comprise means for using the control module 38 to regulate the adjustment means 24.

As described above, if the control module 38 detects a predetermined temperature difference, such as 20° F., between the second electronic sensing device 48 and the third electronic sensing device 50, or if the third electronic sensing device 50 senses a temperature higher than a predetermined allowed temperature, such as 180° F., a precondition for overheating is determined. In this situation, the control module 38 sends a shutdown signal to the board 40 to close the main gas solenoid of unit 22. This provides protection from a water overheat condition as well as high flue gas temperature, i.e., heat exchanger 28 overheat, and uses a single device, the control module 38 to protect from both conditions. The comparison signal, then, is used to determine which of the two electronic sensing devices 48 or 50 should control the modulating orifice 24. This allows the system 10 to adjust for abrupt changes in water flow and incoming water temperature.

In a preferred embodiment, the third electronic sensing device 50 comprises a mid-point temperature indicator to improve the control response time of the modulating orifice 24 in responding to changes in desired outlet water temperature. The third electronic sensing device 50, then, is associated with the control module to respond to abrupt changes in water flow and water temperature. The third electronic sensing device also functions as a flue gas high temperature indicator, usable as a safety device, replacing a separate high temperature flue gas limit switch in the flue gas stream. As explained above, the third electronic sensing device can act as a safety device and send a high temperature signal to a temperature control switch when the midway water temperature is higher than a predetermined high temperature limit. In this situation, the control module 38 is capable of interrupting power to the board 40 and, thereby, shutting down the regulator solenoid unit 22. This cuts off gas to the burner means 14, resulting in a system lockout condition. As a safety feature, the instantaneous water heater 10 will not resume heating of water until another condition occurs, such as engagement of a reset switch, or turning off of all hot water outlets 32 receiving hot water from the system 10 and then turning on at least one water outlet 32.

Referring now to FIG. 2B, when the burner means 14 comprises multiple burners, the present invention provides a higher heating capacity than previously attainable, giving it the ability to precisely control large heat exchangers at low water flows. The present invention uses a unique staging control of either multiple burners in a single heat exchanger, or staging of two or more individual instantaneous water heaters. FIG. 2B illustrates two burners for purposes of description only, and it should be obvious to those skilled in the art that more than two burners can also be used, employing the staging control described herein. Staging of the primary burner 14a and a subsequent burner 14n provides a combined total burner output which will result in the desired outlet water temperature at the faucet 32. The staging control of the present invention controls low output heated water flows so that the water does not overheat or the control module 38 does not cause the modulating orifice 24 to swing from full open to full minimum and back again without being able to find the control point, as that would cause wide fluctuations in water temperature. The staging control may be achieved using one modulating orifice 24 or multiple modulating orifices.

The water heater unit 10 of FIG. 2B operates essentially similar to the water heating unit 10 of FIG. 2A, except for the inclusion of the staging control. This includes the use of one or more solenoid valves 58 to turn on or off a percentage of the total burner 14 output of the instantaneous water heater, or allow gas to subsequent burners 14n or burner/heat exchanger combinations. The control module 38 activates or deactivates the solenoid valve 58 which supplies gas to a portion of the total burner means 14 area, referenced herein as the staging process.

In FIG. 2B, the control module 38 is still used to commence the ignition sequence, with the solenoid valve 58 in the off position. The primary burner means 14a is ignited when the ignition sequence reaches an initial predetermined point. The primary burner is used to heat the water in the heat exchanger 28 until the first burner 14a output demand reaches a predetermined high load. The predetermined high load may be set according to the use of the water heater, and is typically in a range between 60% and 90%, and preferably approximately 80% load. At that point, the solenoid valve 58 is opened and the subsequent or secondary burner means 14n is ignited. The first and subsequent burner outputs are then modulated to maintain a total burner output which can accurately control output water temperature to the desired outlet temperature at faucet 32. This continues until the first and subsequent burner output demands reach a predetermined low load. The predetermined low load may be set according to the use of the water heater, and is typically in a range between 5% and 40%, and preferably approximately 20% load. Then the solenoid valve 58 is closed, turning off the secondary burner means 14n. The lower BTU output can then be controlled by a reduced burner area, specifically by the primary burner 14a, giving better temperature control at lower water flow. The first burner means 14a output is modulated to accurately control output water temperature to the desired outlet water temperature. Solenoid 58 will not be re-opened by the control module 38 until the required condition of primary burner output load is repeated.

The instantaneous water heating unit 10 of FIGS. 2A and 2B may include an optional turbulator tank 60, located between the second electronic sensing device 48 and the hot water outlet 32. Heated water from the system 10 mixes with water in the turbulator tank 60, buffering any rapid temperature changes occurring during system start up or rapid changes in flow rate. This will allow time for the electronic sensing devices 48 and 50 to take initial temperature readings and relay the readings to the control module 38 to control the modulating orifice 24. This will eliminate any rapid temperature change during start up or slow flow situations. For example, nursing home water heaters might include the tank 60 feature to protect against sudden hot or cold water temperature surges. When the system 10 is stationary, i.e., not heating water, then the water in the tank 60 will eventually become approximately ambient temperature. For this reason, it is preferable to keep the size of the tank 60 to a minimum so that rapid temperature stabilization can occur.

Another optional feature for the system 10, a diagnostic telephone connector 62, is illustrated in FIGS. 2A and 2B. The diagnostic telephone connector 62 may be wired to the control module 38 for communication with an on site or remotely located diagnostic computer. The programmable microchip of the control module 38 used to control staging of the multiple burners, can be programmed to report conditions of all electric and electronic parts connected directly or indirectly to the control module 38. The purpose of this would be to give service advice to normally trained plumbers and/or heating and air-conditioning technicians.

The present invention provides a system and method for accurately controlling the output water temperature of an instantaneous water heater, automatically adjusting burner output for changes in water flow and/or incoming water temperature. That is, the system and method of the present invention uses a control module to precisely control output water temperature, even with varying flow rates and varying incoming ambient water temperature, to within ±1°. The instantaneous water heater of the present invention is pilotless, and provides instant flame verification or direct flame rectification by direct flame rectification.

The control module of the present invention is an electronic board that comprises a microchip. The microchip receives information from the electronic sensing devices for a variety of purposes. For example, information from the first electronic sensing device provided to the control module determines if the control module power to the board is to be on or off. In addition, the control module regulates the position of the modulating orifice based on information from the second and third electronic sensing devices, depending on which electronic sensing device is in control of the modulating orifice. The control module determines which of the second or third electronic sensing devices is controlling the modulating orifice by reading a percentage difference between the two electronic sensing devices. Also, the control module returns the modulating orifice to the ignition start position any time the board has been deactivated. Finally, the control module activates or deactivates a solenoid valve that supplies gas to a portion of the total burner area, referenced herein as a staging process.

The instantaneous water heater of the present invention is very efficient, and only operates when the hot water outlet source is turned on. The present invention is particularly advantageous in that it is small enough to use in vacation cabins, land and water based recreational vehicles, house trailers, firemen's hazardous material decontamination units, military field water uses, and any other locations where space and weight are at a premium. Finally, it is an advantage of the present invention that it can provide a higher heating capacity, giving it the ability to precisely control large heat exchangers at low water flows, using the unique staging control of multiple burners.

Having described the invention in detail and by reference to preferred embodiments thereof, it will be apparent that other modifications and variations are possible without departing from the scope of the invention defined in the appended claims.

What is claimed is:

1. An apparatus for accurately controlling output water temperature of an instantaneous water heater to maintain a desired outlet temperature, the instantaneous water heater having a heat exchanger with water tubing and being capable of automatically adjusting a burner means output for changes in water flow and water temperature, the apparatus comprising:

a. a plurality of electronic sensing devices including
      a first thermistor for sensing water flow through the water tubing of the heat exchanger and providing a flow signal to a control module,
      a second thermistor for sensing an outlet water temperature at an outlet of the water tubing of the heat exchanger and for providing outlet water temperature information to the control module, and
      a third thermistor for sensing a midway water temperature at an approximate half way point in the water tubing of the heat exchanger and for providing midway water temperature information to the control module;
   b. means for starting an ignition sequence when a predetermined flow rate has been detected by at least one of the plurality of electronic sensing devices; and
   c. a control adjustment means for receiving the flow signal from the control module, and the water temperature information from the control module to control the burner means output to maintain the desired outlet temperature.

2. The apparatus as claimed in claim 1 wherein the first thermistor comprises a flow meter.

3. The apparatus as claimed in claim 1 wherein the control adjustment means comprises an electrically controlled orifice.

4. The apparatus as claimed in claim 1 wherein the control adjustment means comprises an electrically controlled valve.

5. The apparatus as claimed in claim 1 wherein the control adjustment means comprises a modulating orifice.

6. The apparatus as claimed in claim 1 wherein the control module comprises a means for comparing the midway water temperature information and the outlet water temperature information and providing a comparison signal based on a comparison of a percentage difference of the midway water temperature and the outlet water temperature to reduce a reaction time of the control adjustment means.

7. The apparatus as claimed in claim 1 wherein the second thermistor comprises a primary means for controlling the control adjustment means and the third thermistor comprises a secondary means for controlling the control adjustment means.

8. The apparatus as claimed in claim 7 wherein the secondary means for controlling the control adjustment means overrides the primary means for controlling the control adjustment means when the comparison signal is greater than a predetermined comparison signal, until the comparison signal becomes less than or equal to the predetermined comparison signal.

9. The apparatus as claimed in claim 7 wherein the primary and secondary means for controlling the control adjustment means comprise means for using the control module to regulate the control adjustment means.

10. The apparatus as claimed in claim 1 wherein the burner means comprises one burner.

11. The apparatus as claimed in claim 1 wherein the burner means comprises a plurality of burners.

12. The apparatus as claimed in claim 11 further comprising a means for controlling the plurality of burners using a single modulating orifice.

13. The apparatus as claimed in claim 11 further comprising a means for controlling the plurality of burners using a plurality of modulating orifices.

14. The apparatus as claimed in claim 11 having a primary burner means with a first burner output and a secondary burner means with a subsequent burner output, the first and subsequent burner outputs having a combined total burner output for achieving a desired outlet water temperature, further comprising:
   a. at least one solenoid valve to turn on and off a percentage of the total burner output of the instantaneous water heater;
   b. means for starting an ignition sequence with the at least one solenoid valve in an off position;
   c. means for igniting the primary burner means when the ignition sequence reaches an initial predetermined point;
   d. means for opening the at least one solenoid valve and igniting the secondary burner means when the first burner output demand reaches approximately 80% load;
   e. means for modulating the first and subsequent burner outputs to maintain a total burner output for accurately controlling output water temperature of the instantaneous water heater to the desired outlet temperature;
   f. means for closing the at least one solenoid valve and turning off the secondary burner means when the first and subsequent burner output demands reach approximately 20% load; and
   g. means for modulating the first burner means output to accurately control output water temperature of the instantaneous water heater to the desired outlet water temperature.

15. The apparatus as claimed in claim 14 further comprising means for determining the desired outlet water temperature with a set-point thermostat.

16. The apparatus as claimed in claim 15 wherein the set-point thermostat comprises means for providing the desired output water temperature determination to the control module.

17. The apparatus as claimed in claim 1 wherein the control module comprises a programmable microchip for controlling the burner means output to maintain the desired output water temperature.

18. An apparatus for accurately controlling output water temperature of an instantaneous water heater to maintain a desired outlet temperature at a hot water outlet, the instantaneous water heater having a heat exchanger with water tubing and being capable of automatically adjusting a burner means output for changes in water flow and incoming water temperature, the apparatus comprising:
   a. a first electronic sensing device for sensing a flow of water through the water tubing of the heat exchanger and providing a flow signal to a control module;
   b. means for starting an ignition sequence when a predetermined flow rate has been detected by the first electronic sensing device;
   c. a second electronic sensing device for sensing an outlet water temperature at an outlet of the water tubing of the heat exchanger and for providing outlet water temperature information to the control module;
   d. a third electronic sensing device for sensing a midway water temperature at an approximate half way point in the water tubing of the heat exchanger and for providing midway water temperature information to the control module; and
   e. an adjustment means for receiving the flow signal from the control module, the outlet water temperature information from the control module, and the midway water temperature information from the control module to control the burner means output to maintain the desired outlet water temperature.

19. The apparatus as claimed in claim 18 wherein the adjustment means comprises a modulating orifice.

20. The apparatus as claimed in claim 18 wherein the second electronic sensing device is located at an outlet of a hot water outlet piping of the instantaneous water heater.

21. The apparatus as claimed in claim 18 wherein the second electronic sensing device comprises a primary means for controlling the adjustment means and the third electronic sensing device comprises a secondary means for controlling the adjustment means.

22. The apparatus as claimed in claim 21 wherein the secondary means for controlling the adjustment means overrides the primary means for controlling the adjustment means when the comparison signal is greater than a predetermined comparison signal, until the comparison signal becomes less than or equal to the predetermined comparison signal.

23. The apparatus as claimed in claim 21 wherein the primary and secondary means for controlling the adjustment means comprise means for using the control module to regulate the adjustment means.

24. The apparatus as claimed in claim 18 wherein the burner means comprises one burner.

25. The apparatus as claimed in claim 18 wherein the burner means comprises a plurality of burners.

26. The apparatus as claimed in claim 25 further comprising a means for controlling the plurality of burners using at least one modulating orifice.

27. The apparatus as claimed in claim 25 wherein the control module comprises a programmable microchip for controlling the burner means output to maintain the desired output water temperature.

28. The apparatus as claimed in claim 25 having a primary burner means with a first burner output and a secondary burner means with a subsequent burner output, the first and subsequent burner outputs having a combined total burner output for achieving a desired outlet water temperature, further comprising:
   a. at least one solenoid valve to turn on and off a percentage of the total burner output of the instantaneous water heater;
   b. means for starting an ignition sequence with the at least one solenoid valve in an off position;

c. means for igniting the primary burner means when the ignition sequence reaches an initial predetermined point;

d. means for opening the at least one solenoid valve and igniting the secondary burner means when the first burner output demand reaches approximately 80% load;

e. means for modulating the first and subsequent burner outputs to maintain a total burner output for accurately controlling output water temperature of the instantaneous water heater to the desired outlet temperature;

f. means for closing the at least one solenoid valve and turning off the secondary burner means when the first and subsequent burner output demands reach approximately 20% load; and g. means for modulating the first burner means output to accurately control output water temperature of the instantaneous water heater to the desired outlet water temperature.

29. The apparatus as claimed in claim 28 further comprising means for determining the desired outlet water temperature with a set-point thermostat.

30. The apparatus as claimed in claim 29 wherein the set-point thermostat comprises means for providing the desired output water temperature determination to the control module.

31. The apparatus as claimed in claim 30 further comprising means for controlling the set-point thermostat with a control board to automatically adjust the actual outlet water temperature to maintain the desired outlet water temperature.

32. The apparatus as claimed in claim 28 wherein the means for starting an ignition sequence, and the means for opening and closing the at least one solenoid valve, comprise the control module.

33. The apparatus as claimed in claim 18 wherein the first electronic sensing device is located at an inlet of a cold water inlet piping of the instantaneous water heater.

34. The apparatus as claimed in claim 18 wherein the first electronic sensing device comprises a flow detection means for detecting water flow in the instantaneous water heater, and for causing the burner means output to be turned on when the first electronic sensing device senses water flow and turned off when the first electronic sensing device senses cessation of the water flow.

35. The apparatus as claimed in claim 34 wherein the burner means output is modulated according to rate of flow of water, as determined by the flow detection means.

36. The apparatus as claimed in claim 18 wherein the third electronic sensing device comprises a mid-point temperature indicator to improve the control response time of the modulating orifice in responding to changes in desired outlet water temperature.

37. The apparatus as claimed in claim 18 wherein the third electronic sensing device comprises a flue gas high temperature indicator for sending a high temperature signal to the control module when the midway water temperature is higher than a predetermined high temperature limit.

38. The apparatus as claimed in claim 37 wherein the control module is capable of shutting down the instantaneous water heater when the high temperature signal indicates that the midway water temperature is higher than the predetermined high temperature limit.

39. The apparatus as claimed in claim 18 wherein the control module comprises a means for comparing the midway water temperature information and the outlet water temperature information and providing a comparison signal based on a comparison of a percentage difference of the midway water temperature and the outlet water temperature to reduce a reaction time of the adjustment means.

40. The apparatus as claimed in claim 39 wherein the third electronic sensing device is associated with the control module comparison signal to respond to abrupt changes in water flow and water temperature.

41. The apparatus as claimed in claim 18 further comprising a diagnostic telephone connector means wired to the control module for communication with a diagnostic computer means to provide problematic conditions with the apparatus.

42. The apparatus as claimed in claim 18 further comprising a turbulator tank located between the second electronic sensing device and the hot water outlet for blending water temperatures.

43. An apparatus for accurately controlling output water temperature of an instantaneous water heater to maintain a desired outlet temperature, the instantaneous water heater having a heat exchanger with water tubing and being capable of automatically adjusting a burner means output for changes in water flow and incoming water temperature, the apparatus comprising:

a. a plurality of electronic sensing devices for sensing water flow through the water tubing of the heat exchanger and providing a flow signal to a control module in response thereto, and further for sensing water temperature and providing water temperature information to the control module in response thereto;

b. means for starting an ignition sequence when a predetermined flow rate has been detected by at least one of the plurality of electronic sensing devices;

c. a control adjustment means for receiving the flow signal from the control module, and the water temperature information from the control module to control the burner means output to maintain the desired outlet temperature;

d. staging means associated with the control adjustment means for adjusting a percentage of the burner means output of the instantaneous water heater to maintain the desired outlet temperature.

44. The apparatus as claimed in claim 43 wherein the plurality of electronic sensing devices comprises:

a. a first thermistor for sensing the water flow through the water tubing of the heat exchanger and providing a flow signal to the control module;

b. a second thermistor for sensing an outlet water temperature at an outlet of the water tubing of the heat exchanger and for providing outlet water temperature information to the control module; and c. a third thermistor for sensing a midway water temperature at an approximate half way point in the water tubing of the heat exchanger and for providing midway water temperature information to the control module.

45. The apparatus as claimed in claim 43 wherein the control adjustment means comprises a modulating orifice.

46. The apparatus as claimed in claim 43 wherein the burner means comprises a plurality of burners.

47. The apparatus as claimed in claim 46 wherein the staging means comprises means for controlling the plurality of burners using a single modulating orifice.

48. The apparatus as claimed in claim 46 wherein the staging means comprises means for controlling the plurality of burners using a plurality of modulating orifices.

49. The apparatus as claimed in claim 46 wherein the staging means comprises a programmable microchip in the control module for controlling staging of the plurality of burners to maintain the desired output water temperature.

50. The apparatus as claimed in claim 46 having a primary burner means with a first burner output and a secondary burner means with a subsequent burner output, the first and subsequent burner outputs having a combined total burner output for achieving a desired outlet water temperature, the staging means further comprising:
   a. at least one solenoid valve to turn on and off a percentage of the total burner output of the instantaneous water heater;
   b. means for starting an ignition sequence with the at least one solenoid valve in an off position;
   c. means for igniting the primary burner means when the ignition sequence reaches an initial predetermined point;
   d. means for opening the at least one solenoid valve and igniting the secondary burner means when the first burner output demand reaches approximately 80% load;
   e. means for modulating the first and subsequent burner outputs to maintain a total burner output for accurately controlling output water temperature of the instantaneous water heater to the desired outlet temperature;
   f. means for closing the at least one solenoid valve and turning off the secondary burner means when the first and subsequent burner output demands reach approximately 20% load; and
   g. means for modulating the first burner means output to accurately control output water temperature of the instantaneous water heater to the desired outlet water temperature.

51. The apparatus as claimed in claim 50 further comprising means for determining the desired outlet water temperature with a set-point thermostat.

52. An apparatus for accurately controlling output water temperature of an instantaneous water heater to maintain a desired outlet temperature, the instantaneous water heater having a heat exchanger with water tubing and being capable of automatically adjusting a burner means output for changes in water temperature, the apparatus comprising:
   a. an outlet thermistor for sensing an outlet water temperature at an outlet of the water tubing of the heat exchanger and for providing outlet water temperature information to a control module;
   b. a midway thermistor for sensing a midway water temperature at an approximate half way point in the water tubing of the heat exchanger and for providing midway water temperature information to the control module; and
   c. a control adjustment means for receiving the water temperature information from the control module to control the burner means output to maintain the desired outlet temperature.

53. The apparatus as claimed in claim 1 wherein the plurality of electronic sensing devices comprises:
   a. an inlet thermistor for sensing the inlet water temperature;
   b. a flow meter for sensing flow rate through the water tubing of the heat exchanger and providing a flow signal to the control module; and
   c. a midway thermistor for sensing a midway water temperature at an approximate half way point in the water tubing of the heat exchanger and for providing midway water temperature information to the control module.

* * * * *